US012616915B2

(12) United States Patent
Zhu

(10) Patent No.: US 12,616,915 B2
(45) Date of Patent: May 5, 2026

(54) ROTARY EVAPORATOR FOR CATALYST PREPARATION

(71) Applicant: Saudi Arabian Oil Company, Dhahran (SA)

(72) Inventor: Guanghui Zhu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 623 days.

(21) Appl. No.: 18/176,635

(22) Filed: Mar. 1, 2023

(65) Prior Publication Data

US 2024/0293760 A1 Sep. 5, 2024

(51) Int. Cl.
| | |
|---|---|
| *B01D 3/08* | (2006.01) |
| *B01D 3/34* | (2006.01) |
| *B01D 3/42* | (2006.01) |
| *B01D 5/00* | (2006.01) |
| *B01J 37/02* | (2006.01) |
| *B05D 3/02* | (2006.01) |
| *B05D 3/12* | (2006.01) |

(52) U.S. Cl.
CPC ............. *B01D 3/085* (2013.01); *B01D 3/346* (2013.01); *B01D 3/42* (2013.01); *B01D 5/006* (2013.01); *B01D 5/009* (2013.01); *B01J 37/0236* (2013.01); *B05D 3/0254* (2013.01); *B05D 3/12* (2013.01)

(58) Field of Classification Search
CPC ........ B01D 3/085; B01D 5/006; B01D 3/346; B01D 3/42; B01D 5/009; B01J 37/0236; B05D 3/0254; B05D 3/12
See application file for complete search history.

(56) References Cited

U.S. PATENT DOCUMENTS

| | | | | |
|---|---|---|---|---|
| 2013/0153397 A1* | 6/2013 | Carl | ......................... | B01D 3/42 |
| | | | | 202/262 |
| 2020/0197830 A1* | 6/2020 | Rind | ........................ | B01D 3/02 |
| 2022/0203260 A1* | 6/2022 | Gandar | ................ | B01D 5/0045 |

FOREIGN PATENT DOCUMENTS

| | | | | | |
|---|---|---|---|---|---|
| CN | 108283819 A | * | 7/2018 | ........... | B01D 1/0082 |
| DE | 10256651 B4 | | 11/2006 | | |
| EP | 0628330 A1 | | 12/1994 | | |

(Continued)

OTHER PUBLICATIONS

CN-108283819-A_English translation (Year: 2018).*

(Continued)

*Primary Examiner* — Youngsul Jeong
(74) *Attorney, Agent, or Firm* — DINSMORE & SHOHL LLP

(57) ABSTRACT

A rotary evaporator includes a sample flask having a reservoir for receiving a sample and a neck in communication with the reservoir. The neck extends along an axis and a purge tube extends within the neck of the sample flask along the axis. The purge tube includes a distal end and at least one opening formed in the purge tube at the distal end, the distal end being closed. Purge gas is supplied to the purge tube and injected into the sample flask via the at least one opening. The purge tube is movable along the axis via an actuator, between a retracted position, where the distal end of the purge tube is situated in the neck of the sample flask, and an extended position, where the distal end of the purge tube is situated in the reservoir of the sample flask.

20 Claims, 3 Drawing Sheets

(56) References Cited

FOREIGN PATENT DOCUMENTS

KR          102356870 B1 * 1/2022   .............. B01D 3/10

OTHER PUBLICATIONS

KR-102356870-B1_English translation (Year: 2022).*
Ganz (Simple rotary evaporator adaptor for use in thin film evaporation with an inert gas stream, Analytical Chemistry, vol. 45, No. 8, Jul. 1973, p. 1567) (Year: 1973).*
Polniaszek (A New Philosophy for Teaching Advanced Organic Chemistry: Representative Laboratory Experiment: Stereoselective Reduction of a Chiral Iminium Ion, Journal of Chemical Education, vol. 66, No. 11, Nov. 1989, pp. 970-973) (Year: 1989).*
Lepage, et al. "Chapter 5: the preparation of catalysts", Applied heterogeneous catalysis. Design-manufacture use of solid catalysts, 1987.
Perego et al., "Catalyst preparation methods", Catalysts Today, vol. 34, pp. 281-305, 1997.

* cited by examiner

ROTARY EVAPORATOR FOR CATALYST PREPARATION

FIELD

The present disclosure relates to catalyst preparation and, more specifically, to rotary evaporator apparatuses.

BACKGROUND

Wet impregnation is a common method for adding a metal onto a catalyst support. After introducing metal solution to the catalyst support, the liquid is evaporated and the metal deposits onto the catalyst support. During wet impregnation, the drying rate of the metal solution is critical to make a highly efficient catalyst. A rotary evaporator is an apparatus that is commonly used for the evaporation process. With regard to commercially available rotary evaporators, the evaporation rate may be controlled by adjusting the flask pressure or adjusting the temperature. However, adjusting pressure and temperature in this manner may result in water condensation and backflow, which reduces the evaporation quality. In particular, water vapor from the flask tends to condensate on the neck because the temperature of the neck is lower than the metal solution which sits inside a heat bath, water droplets from condensation will flow back to the flask and wet the catalyst, and wetted catalyst pellets tend to stay on the flask wall and cause non-uniform evaporation. Accordingly, a need exists for an improved rotary evaporator.

BRIEF SUMMARY

According to one or more aspects of the present disclosure, a rotary evaporator may include a sample flask having a reservoir for receiving the sample and a neck in communication with the reservoir, wherein the neck extends along an axis. The rotary evaporator may also include a purge tube extending within the neck of the sample flask along the axis, such that a vapor channel is defined between an inner surface of the neck of the sample flask and an outer surface of the purge tube. The purge tube may include a proximal end, a distal end, a wall provided at the distal end such that the distal end is closed, an inner lumen extending along the axis between the proximal end and the distal end, and an opening formed in the outer surface of the purge tube at the distal end and in communication with the inner lumen. The rotary evaporator may also include a purge gas source in communication with the inner lumen of the purge tube for supplying a purge gas to the inner lumen of the purge tube. The rotary evaporator may also include a first actuator operable to rotate the sample flask about the axis, and a second actuator operable to translate the purge tube along the axis between a retracted position, where the opening of the purge tube is situated in the neck of the sample flask, and an extended position, where the at least one opening of the purge tube is situated in the reservoir of the sample flask. The rotary evaporator may also include a bath for receiving the reservoir of the sample flask and heating the sample when contained in the reservoir, and a collection flask in fluid communication with the vapor channel for receiving solvent evaporated from the sample.

According to one or more other aspects of the present disclosure, a method for evaporating a solvent from a sample may include placing the sample in a reservoir of a sample flask, wherein the sample flask comprises a neck that extends along an axis and is in communication with the reservoir; heating the reservoir of the sample flask in a bath. The method may also include rotating the sample flask around the axis by a first actuator during the heating, and supplying a purge gas from a purge gas source to a purge tube. The purge tube may extend within the neck of the sample flask along the axis, such that a vapor channel is defined between an inner surface of the neck and an outer surface of the purge tube. The purge tube may include a proximal end, a distal end, a wall provided at the distal end such that the distal end is closed, an inner lumen extending along the axis between the proximal end and the distal end, and an opening formed in the outer surface of the purge tube at the distal end of the purge tube and in communication with the inner lumen, and the purge gas source is in communication with the inner lumen of the purge tube. The method may also include injecting the purge gas into the sample flask via the at least one opening formed in the outer surface of the purge tube, and adjusting a position of the purge tube along the axis via a second actuator. The second actuator may be operable to translate the purge tube along the axis between a retracted position, where the at least one opening of the purge tube is situated in the neck of the sample flask, and an extended position, where the at least one opening of the purge tube is situated in the reservoir of the sample flask. The method may also include guiding vapor formed by the heating through the vapor channel into a condenser where the vapor is condensed into the solvent, and receiving the solvent in a collection flask that is in fluid communication with the condenser.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure is directed to rotary evaporator apparatuses for controlling evaporation rate and preventing vapor condensation during catalyst preparation and methods of the same. Embodiments of the presently disclosed rotary evaporators include a purge tube for supplying purge gas, wherein the purge tube is movable relative to a sample flask and the flow rate of the purge gas and the temperature of the purge gas is controllable, so as to thereby provide better control of the evaporation rate and prevent water condensation, as compared to conventional apparatuses.

Figure 1:
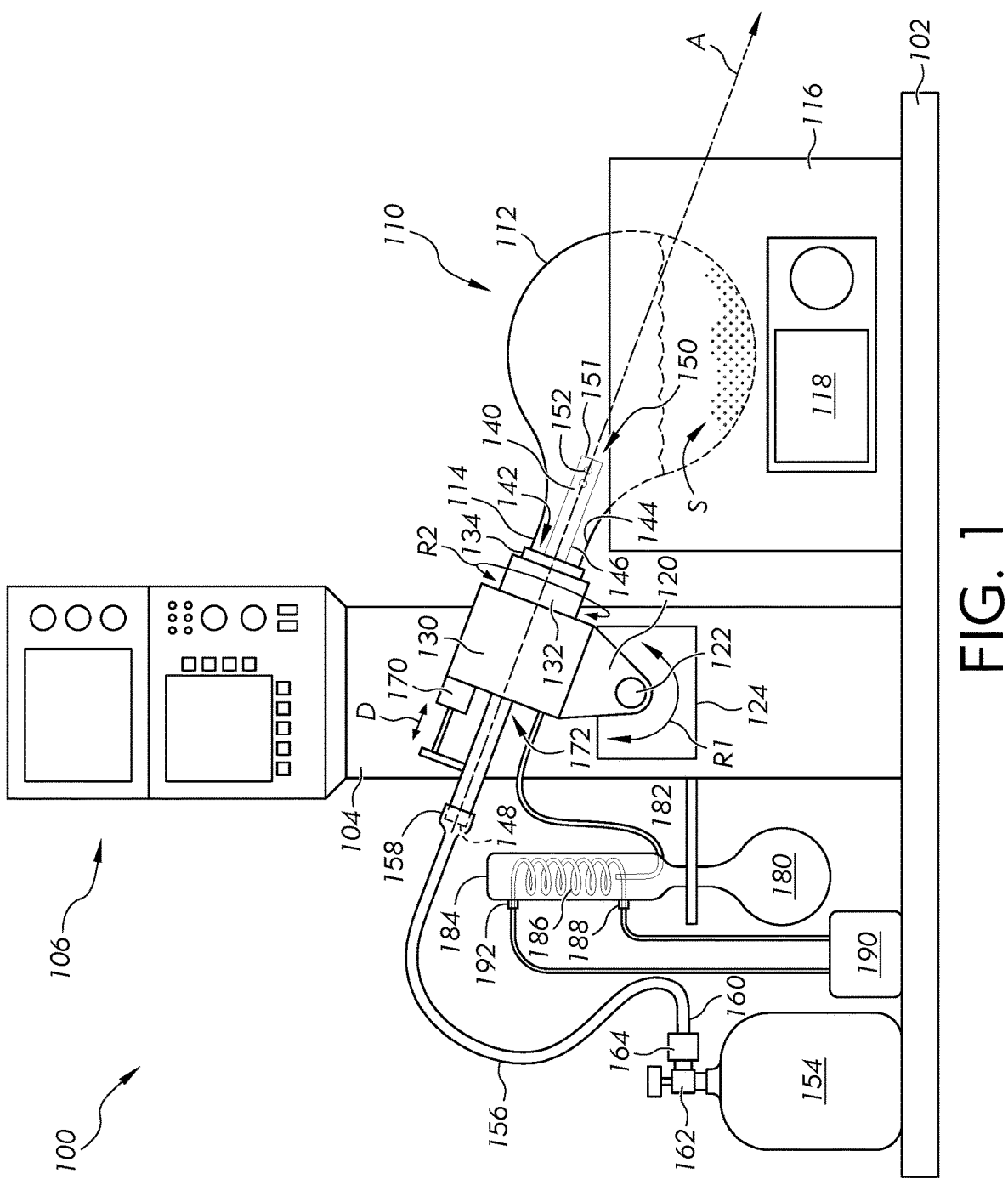
FIG. 1 schematically depicts a rotary evaporator, according to embodiments shown and described herein.

FIG. 1 schematically depicts a rotary evaporator 100, according to one or more embodiments shown and described herein. In the illustrated embodiment, the rotary evaporator 100 includes a base 102 and a tower 104 provided on the base 102. The rotary evaporator 100 also includes a controller 106. As hereinafter described, the controller 106 is operable to control one or more operating parameters of the rotary evaporator 100. In the illustrated embodiment, the controller 106 is embodied as a human machine interface (HMI), and the user may interact with the HMI in order to control operation of the rotary evaporator 100. Also, in the illustrated embodiment, the HMI is disposed on the tower 104, however, the HMI and/or the controller 106 may be differently disposed without departing from the present disclosure.

The rotary evaporator 100 includes a sample flask 110. The sample flask 110 includes a reservoir 112 for holding a sample S and a neck 114 in communication with the reservoir 112, wherein the neck 114 extends along an axis A. As further described, the sample S contains a solvent and the rotary evaporator 100 is operable for removing the solvent from the sample S via evaporation, thereby leaving a concentrated compound in the reservoir 112 of the sample flask 110. While the reservoir 112 of the sample flask 110 is illustrated as being a round, it may have other geometries without departing from the present disclosure, such as a pear-shaped geometry.

The rotary evaporator 100 includes a bath 116 for receiving the reservoir 112 of the sample flask 110 and heating the sample S contained therein. The bath 116 is sized to receive at least the reservoir 112 and contains a heating medium, such as water or oil. The bath 116 includes a heat source 118 operable to heat the heating medium contained therein and thereby heat the sample S contained in the reservoir 112. While the bath 116 is depicted as being disposed on the base 102, in other embodiments, the bath 116 is not provided on the base 102. In embodiments, the heat source 118 is in communication with the controller 106, such that the controller 106 is operable to adjust a temperature of the heating medium contained within the bath 116.

The sample flask 110 is movable relative to the bath 116. In this manner, the reservoir 112 may be moved into the bath 116 such that it is at least partially immersed in the heating medium contained in the bath 116 and moved out of the heating medium. In the illustrated embodiment, the sample flask 110 is supported by an arm 120, and the arm 120 is rotatably coupled to the tower 104 via a pin 122 such that the arm 120 is rotatable about an axis defined by the pin 122, as indicated by rotational arrow R1. Thus, the sample flask 110 is also rotatable about the axis defined by the pin 122, as indicated by the rotational arrow R1. Also in the illustrated embodiment, the rotary evaporator 100 includes an actuator 124 operable to rotate the arm 120 and the sample flask 110 supported by the arm 120. In this manner, the actuator 124 is operable to move the reservoir 112 into the bath 116 and out of the bath 116, such that the heating medium contained in the bath 116 may heat the sample S contained in the reservoir 112 when the reservoir 112 is positioned in the bath 116. In embodiments, the actuator 124 is in communication with the controller 106, such that the controller 106 is operable to cause the actuator 124 to move the sample flask 110 into and out of the heating medium contained in the bath 116.

The rotary evaporator 100 also includes an actuator 130 operable to rotate the sample flask 110 about the axis A, as indicated by rotational arrow R2. The actuator 130 is supported by the arm 120 such that the actuator 130 may be rotated about the axis defined by the pin 122, as indicated by the rotational arrow R1, in order to move the reservoir 112 in the bath 116 as described above. The receiving flask 110 is coupled to the actuator 130 via a clamp 132, and the actuator 130 rotates the clamp 132 about the axis A, as indicated by the rotational arrow R2. In this manner, the actuator 130 may rotate the sample flask 110 as indicated by the rotational arrow R2. In embodiments, the actuator 130 is a rotary motor. In embodiments, the actuator 130 is in communication with the controller 106, such that the controller 106 is operable to cause the actuator 130 to rotate the sample flask 110 as indicated by the rotational arrow R2.

The clamp 132 has an engaged condition, wherein the clamp 132 is rigidly attached to the neck 114 of the receiving flask 110, and an unengaged condition, wherein the neck 114 of the receiving flask 110 is not attached to the clamp 132. Thus, when the clamp 132 is in the engaged position, the sample flask 110 is rotatably attached to the actuator 130 such that the sample flask 110 may be rotated by the actuator 130; whereas, when the clamp 132 is in the unengaged condition, the sample flask 110 may be removed from the actuator 130. In embodiments, a seal 134 is disposed between the clamp 132 and the neck 114 of the receiving flask 110.

The rotary evaporator 100 includes a purge tube 140 extending within the neck 114 of the sample flask 110 along the axis A, such that a vapor channel 142 is defined between an inner surface 144 of the neck 114 and an outer surface 146 of the purge tube 140. The purge tube 140 includes a proximal end 148 and a distal end 150. Further, the purge tube 140 includes at least one opening 152 formed in the outer surface 146 of the purge tube 140 at the distal end 150. A wall 151 is disposed at the distal end 150 of the purge tube 140, such that the distal end 150 of the purge tube 140 is closed and such that flow entering the purge tube 140 at the proximal end 148 is unable to flow straight through the purge tube 140 and through the wall 151 thereof, but such flow is instead directed out of the at least one opening 152 which are located proximal from the wall 151.

Figure 2:
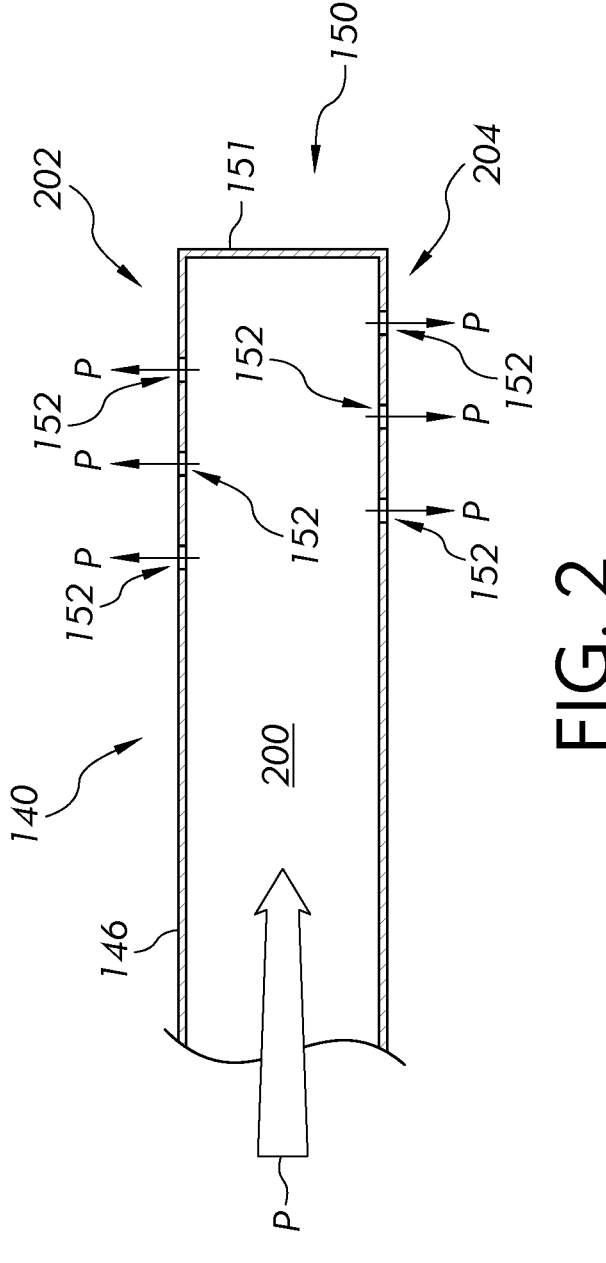
FIG. 2 schematically depicts a distal section of a purge tube of the rotary evaporator of FIG. 1, according to embodiments shown and described herein.

FIG. 2 schematically depicts a distal section of the purge tube 140, according to one or more embodiments shown and described herein. As shown, the purge tube 140 is hollow and defines an inner lumen 200 extending along the axis A, between the proximal end 148 and the distal end 150. Also, the at least one opening 152 formed in the outer surface 146 of the purge tube 140 are in communication with the inner lumen 200 defined within the purge tube 140, such that a purge gas P introduced into the inner lumen 200 may flow out of the inner lumen 200 through the at least one opening 152. As previously mentioned, the distal end 150 of the purge tube 140 is closed by the wall 151, such that the purge gas P is inhibited from flowing through the distal end 150, but redirected out through at least one opening 152. In embodiments, the at least one opening 152 formed in the purge tube 140 comprises at least two openings and, in such embodiments, the at least two openings are evenly distributed about the outer surface 146 of the purge tube 140. In embodiments, the at least one opening 152 is oriented on the purge tube 140 such that the purge gas P flows out through the at least one opening 152 in a direction that is substantially perpendicular to the flow of the purge gas P through the inner lumen 200 of the purge tube 140. In embodiments, the at least one opening 152 is oriented on the purge tube 140 such that the purge gas P flows out through the at least one opening 152 in a direction that is oriented slightly towards the proximal end 148, such that the flow of the purge gas P out of the at least one opening 152 is slightly opposite than the direction of the purge gas P flowing within the lumen 200.

In the illustrated example, the at least one opening 152 includes three openings on a first side 202 of the purge tube 140 and three openings on a second side 204 of the purge tube 140. Here, the three openings on the second side 204 of the purge tube 140 are unaligned with the three openings on the first side 202 of the purge tube 140, such that the three openings on the second side 204 of the purge tube 140 are offset therefrom and positioned closer to the distal end 150. In other embodiments, more than three openings are provided on the first side 202 and/or on the second side 204. In other embodiments, the openings on the first side 202 are aligned with the openings on the second side 204. In other embodiments, one or more additional openings are provided elsewhere about the purge tube 140, in addition to or instead of on the first side 202 and/or on the second side 204.

Referring again to FIG. 1, the rotary evaporator 100 also includes a purge gas source 154 in communication with the inner lumen 200 of the purge tube 140 for supplying the purge gas P to the inner lumen 200 of the purge tube 140. As hereinafter described, the purge tube 140 injects the purge gas P into the sample flask 110 through the at least one opening 152 formed in the outer surface 146 of the purge tube 140. In embodiments, the purge tube 140 is communicatively coupled to the purge gas source 154 via a flexible tube 156. For example, a first end 158 of the flexible tube 156 may be connected to the proximal end 148 of the purge tube 140 and a second end 160 of the flexible tube 156 may be connected to the purge gas source 154. Suitable purge gases include, but are not limited to, nitrogen, air, Argon, helium, etc.

In embodiments, flow rate of the purge gas P and/or temperature of the purge gas P supplied by the purge gas source 154 may be controlled. In the illustrated embodiment, the purge gas source 154 includes a valve 162 operable to adjust the flow rate at which the purge gas P is supplied to the purge tube 140 and, thereby, the flow rate at which the purge gas P is injected into the sample flask 110 via the at least one opening 152. In embodiments, the valve 162 of the purge gas source 154 is in communication with the controller 106, such that the controller 106 is operable to control the degree to which the valve 162 is opened or closed to thereby control the flow rate of the purge gas P supplied by the purge tube 140. Also in the illustrated embodiment, the purge gas source 154 includes a heater 164 operable to adjust the temperature of the purge gas P supplied to the purge tube 140 and, thereby, the temperature of the purge gas P when it is injected into the sample flask 110 via the at least one opening 152. In embodiments, the heater 164 of the purge gas source 154 is in communication with the controller 106, such that the controller 106 is operable to control the amount of heating applied to the purge gas P to thereby control the temperature of the purge gas P supplied by the purge tube 140.

Figure 3A:
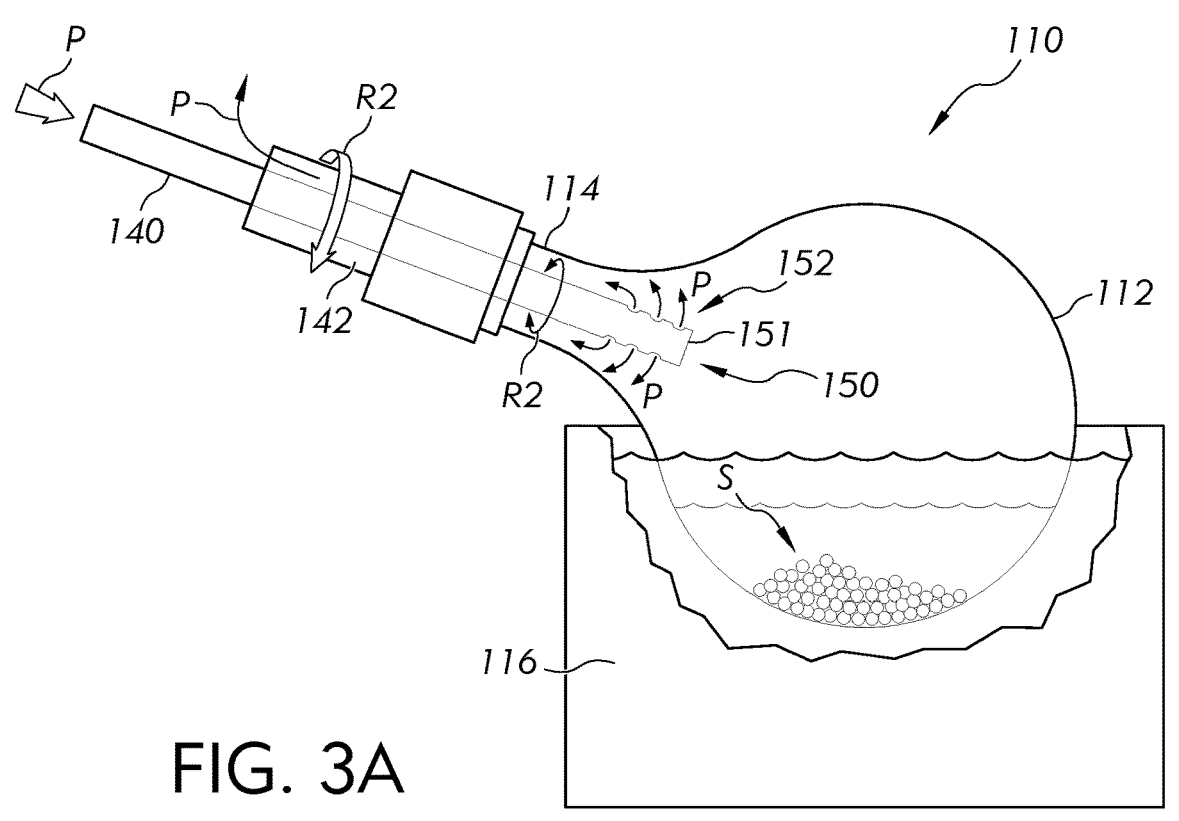
FIG. 3A schematically depicts the purge tube of the rotary evaporator of FIG. 1 when in a retracted position, according to embodiments shown and described herein.
Figure 3B:
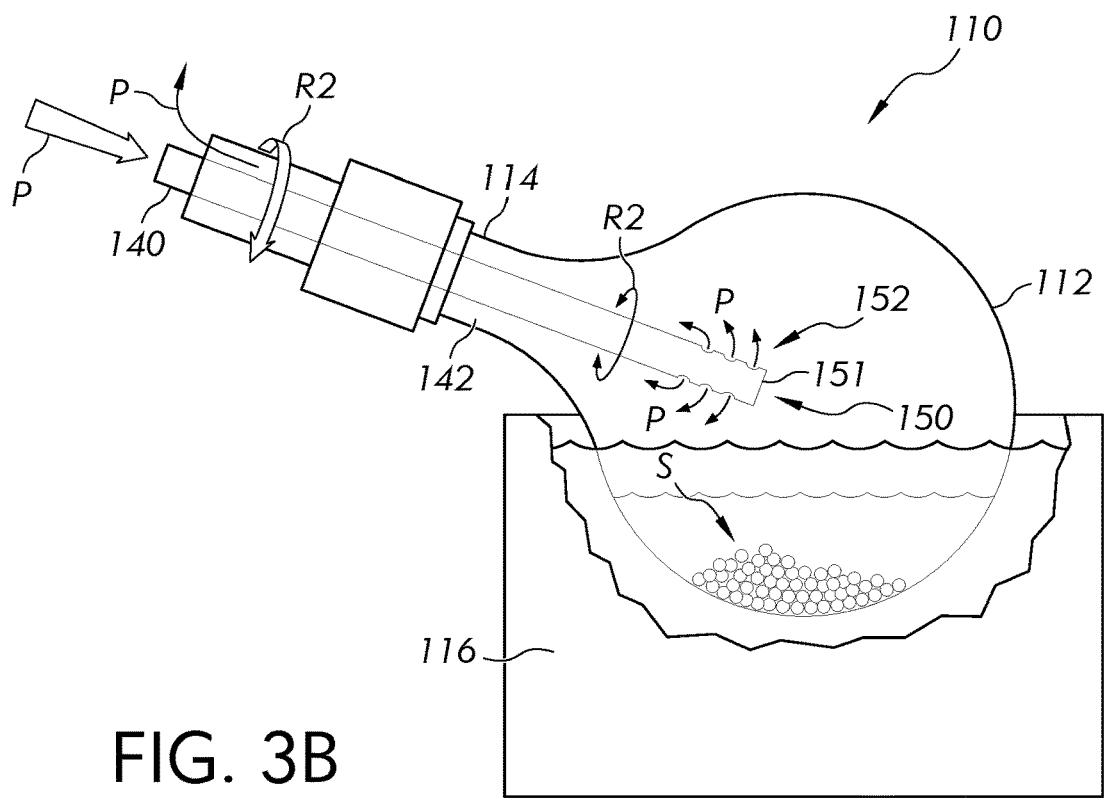
FIG. 3B schematically depicts the purge tube of the rotary evaporator of FIG. 1 when in an extended position, according to embodiments shown and described herein.

The rotary evaporator 100 also includes an actuator 170 operable to translate the purge tube 140 along the axis A as indicated by arrow D. In embodiments, the actuator 170 is in communication with the controller 106, such that the controller 106 is operable to cause the actuator 170 to translate the purge tube 140 along the axis A and thereby control the position of the at least one opening 152 within the sample flask 110. In particular, the actuator 170 is operable to move the purge tube 140 between a retracted position, where the at least one opening 152 of the purge tube 140 is situated in the neck 114 of the sample flask 110, and an extended position, where the at least one opening 152 of the purge tube 140 is situated in the reservoir 112 of the sample flask 110. FIG. 3A schematically depicts the purge tube 140 when in the retracted position and FIG. 3B schematically depicts the purge tube 140 when in the extended position, according to one or more embodiments shown and described herein. In addition to being moved into the extended and retracted positions, the controller 106 is operable to move the purge tube 140 into various positions between the extended and retracted positions.

Because the purge gas P exits the purge tube 140 via the at least one openings 152 on the sides of the purge tube 140, as shown in FIGS. 3A and 3B, the evaporation rate of the sample S in the reservoir 112 can be controlled by the flow rate of the purge gas P introduced into the sample flask 110, as well as by the position of the purge tube 140 within the sample flask 110. When the at least one opening 152 is positioned beyond the neck 114 of the sample flask 110, as shown in FIG. 3B, the purge gas P can more easily spread inside the reservoir 112 and carry a relatively larger amount of moisture out of the reservoir 112 as compared to when the at least one opening 152 is retracted within the neck 114. When the purge tube 140 is in the retracted position such that the least one opening 152 is positioned inside the neck 114, as shown in FIG. 3A, the purge gas P can only carry out the moisture that is present in the neck 114, thereby resulting in a relatively lower rate of evaporation.

For example, during the later stages of evaporating the solvent from the sample S using conventional rotary evaporators, when much (or all) of the free liquid in the solution S is gone, sample S particles can achieve free-rolling and good mixing which allows uniform heating of the particles. The challenge is that the vapor pressure is still high due to the evaporation of solvent hold inside the sample pores, the solvent vapor will flow into the relatively cooler neck of the sample flask, where the solvent vapor condenses and flows back into the sample flask. Such condensation and backflow may present challenges when using conventional rotary evaporators, because it slows down the evaporation and the catalyst particles can be wetted again. This is problematic because the re-wetted catalyst particles tend to stick to the inner walls of the sample flask and have different drying rate than the other catalyst particles. However, when using the rotary evaporator 100, the purge tube 140 provides a means for accelerating evaporation in a controlled manner by adjusting its position and adjusting the flow rate of the purge gas P. Further use of the purge tube 140 in the rotary evaporator 100 provides a means of lowering the partial pressure of the solvent vapor so that it will not condense when passing through the cold neck, for example, the purge tube 140 may be moved into the extended position during such later stages of the evaporation process to reduce the moisture partial pressure in the flask and prevent condensation.

Referring again to FIG. 1, the actuator 170 may comprise various types of actuators. In embodiments, actuator 170 is a linear actuator. For example, the actuator 170 may include a drive nut and a drive screw, with proximal end of the drive screw being coupled to the purge tube 140 and extending parallel to the axis A. Here, the actuator 170 causes rotation of the drive nut, and rotation of the drive nut translates the drive screw which carries the purge tube 140 as it translates, such that the purge tube 140 translates in a first direction or a second direction opposite the first direction as indicated by the arrow D. In another example, a thread is formed on at least a portion 172 of the outer surface 146 of the purge tube 140 and the actuator 170 includes a drive nut operatively arranged around the thread of the purge tube 140. In this example, the actuator 170 causes rotation of the drive nut, and rotation of the drive nut translates the purge tube 140 in the first direction or in the second direction along the axis A, as indicated by the arrow D. In another example, the portion 172 of the outer surface 146 of the purge tube 140 may include a plurality of gear teeth (or a rack gear) and the actuator 170 includes a pinion gear that engages the gear teeth to thereby translate the purge tube 140 as indicated by the arrow D when the actuator 170 drives the pinion gear.

The rotary evaporator 100 also a collection flask 180 for receiving solvent evaporated from the sample S. The collection flask 180 is in fluid communication with the vapor channel 142. In the illustrated embodiment, a conduit 182 is in fluid communication with the vapor channel 142 and directs vapor into a condenser 184. The condenser 184 includes a coil 186 (positioned within an interior volume of the condenser 184) through which cooling fluid is directed for condensing vapor into fluid, which is then collected in the collection flask 180. The coil 186 has a fluid input 188 that is in fluid communication with a fluid source 190 and a fluid output 192 that is also in fluid communication with the fluid source 190, such that fluid may be continuously recirculated through the coil 186 in the condenser 184. The conduit 182 extends into the condenser 184 and at least partially into and through the coil 186, such that the vapor is deposited at the coil 186. The collection flask 180 is in fluid communication with the interior volume of the condenser 184 such that the vapor that is condensed by the coil 186 may flow into the collection flask 180.

The present disclosure is also directed towards methods of evaporating the solvent from the sample S. The method may include placing the sample S in the reservoir 112 of the sample flask 110. The method may also include heating the sample S contained in the reservoir 112 of the sample flask 110 in the bath 116. During the heating, the heat source 118 heats the heating medium contained in the bath 116, and the controller 106 may be utilized to control the heat source 118 and thereby control the temperature of the heating medium. Prior to the heating, the method may include at least partially immersing the reservoir 112 in the heating medium in the bath 116, and the at least partially immersing the reservoir 112 may include moving the sample flask 110 into the bath 116 via the actuator 124. In addition, the method includes rotating the sample flask 110 around the axis A by the actuator 130 during the heating. However, in embodiments, the rotating the sample flask 110 may begin before the heating.

The method also includes supplying the purge gas from the purge gas source 154 to the inner lumen 200 of the purge tube 140, and then injecting the purge gas P into the sample flask 110 via the at least one opening 152 formed in the outer surface 146 of the purge tube 140. Further, the method includes adjusting a position of the purge tube 140 along the axis A via the actuator 170, wherein the actuator 170 is operable to translate the purge tube 140 along the axis A between the retracted position, where the at least one opening 152 of the purge tube 140 is situated in the neck 114 of the sample flask 110, and an extended position, where the at least one opening 152 of the purge tube 140 is situated in the reservoir 112 of the sample flask 110. Additionally, the method includes guiding vapor formed by the heating through the vapor channel 142 into the condenser 184 where the vapor is condensed into the solvent, and receiving the solvent in the collection flask 180 that is in fluid communication with the condenser 184.

In embodiments, the method further includes adjusting a flow rate of the purge gas P, for example, via the valve 162 and the controller 106. In embodiments, the method further includes adjusting the temperature of the purge gas P, for example, via the heater 164 and the controller 106. In embodiments, the adjusting the position of the purge tube 140 along the axis A via the actuator 170 further includes adjusting a distance at which the purge tube extends into the sample flask 110 before the solvent is evaporated by the heating. In embodiments, the adjusting the position of the purge tube 140 along the axis A via the actuator 170 includes positioning the at least one opening 152 of the purge tube 140 within the neck 114 of the sample flask 110 during an initial stage of the heating, and moving the purge tube 140 into the extended position, such that the at least one opening 152 of the purge tube 140 is positioned within the reservoir 112, at a later stage of the heating. In embodiments, the method further includes adjusting the flow rate and the temperature of the purge gas P before evaporation is caused by the heating; whereas, in other embodiments, the method further includes adjusting the flow rate and the temperature of the purge gas P after evaporation is caused by the heating.

One or more aspects of the present disclosure are described here. A first aspect of the present disclosure may include a rotary evaporator with a sample flask having a reservoir for receiving the sample and a neck in communication with the reservoir, wherein the neck extends along an axis. The rotary evaporator may also include a purge tube extending within the neck of the sample flask along the axis, such that a vapor channel is defined between an inner surface of the neck of the sample flask and an outer surface of the purge tube. The purge tube may include a proximal end, a distal end, a wall provided at the distal end such that the distal end is closed, an inner lumen extending along the axis between the proximal end and the distal end, and an opening formed in the outer surface of the purge tube at the distal end and in communication with the inner lumen. The rotary evaporator may also include a purge gas source in communication with the inner lumen of the purge tube for supplying a purge gas to the inner lumen of the purge tube. The rotary evaporator may also include a first actuator operable to rotate the sample flask about the axis, and a second actuator operable to translate the purge tube along the axis between a retracted position, where the opening of the purge tube is situated in the neck of the sample flask, and an extended position, where the at least one opening of the purge tube is situated in the reservoir of the sample flask. The rotary evaporator may also include a bath for receiving the reservoir of the sample flask and heating the sample when contained in the reservoir, and a collection flask in fluid communication with the vapor channel for receiving solvent evaporated from the sample.

A second aspect of the present disclosure may include the first aspect, further comprising a controller operable to control movement of the purge tube between the retracted position and the extended position.

A third aspect of the present disclosure may include the first aspect, further comprising a controller operable to control a flow rate and a temperature of the purge gas.

A fourth aspect of the present disclosure may include the first aspect, further comprising a flexible tube that communicatively couples the proximal end of the purge tube to the purge gas source, wherein a first end of the flexible tube is connected to the proximal end and a second end of the flexible tube is connected to the purge gas source A fifth aspect of the present disclosure may include the first aspect, wherein the opening formed in the purge tube comprises a plurality openings.

A sixth aspect of the present disclosure may include the fifth aspect, wherein the plurality of openings are evenly distributed about the outer surface of the purge tube.

A seventh aspect of the present disclosure may include the first aspect, further comprising a third actuator operable to move the reservoir into the bath and out of the bath, wherein the bath heats the sample contained in the reservoir when the reservoir is positioned in the bath.

A eighth aspect of the present disclosure may include the first aspect, wherein the second actuator comprises a drive nut and a drive screw, the drive screw being coupled to the purge tube and extending parallel to the axis, wherein the second actuator causes rotation of the drive nut, and rotation of the drive nut translates the drive screw and the purge tube in a first direction or a second direction opposite the first direction.

A ninth aspect of the present disclosure may include the first aspect, wherein the outer surface of the purge tube comprises a thread and the second actuator comprises a drive nut operatively arranged around the thread of the purge tube, and wherein the second actuator causes rotation of the drive nut, and rotation of the drive nut translates the purge tube in a first direction or a second direction opposite the first direction along the axis.

A tenth aspect of the present disclosure may include the first aspect, wherein the outer surface of the purge tube comprises a rack gear and the second actuator comprises a pinion gear engaging the rack gear of the purge tube, and wherein the second actuator causes rotation of the pinion gear, and rotation of the pinion gear translates the purge tube in a first direction or a second direction opposite the first direction along the axis.

A eleventh aspect of the present disclosure may include the first aspect, further comprising a third actuator operable to move the reservoir into the bath and out of the bath, wherein the bath heats the sample contained in the reservoir when the reservoir is positioned in the bath; and a controller, wherein: the controller is operable to control the third actuator and thereby cause movement of the sample flask into and out of the bath; the controller is operable to control the first actuator and thereby cause rotation of the sample flask about the axis; and the controller is operable to control the second actuator and thereby cause movement of the purge tube between the retracted position and the extended position.

A twelfth aspect of the present disclosure may include the eleventh aspect, wherein the controller operable to control a flow rate and a temperature of the purge gas.

A thirteenth aspect of the present disclosure may include a method for evaporating a solvent from a sample. The method includes placing the sample in a reservoir of a sample flask, wherein the sample flask comprises a neck that extends along an axis and is in communication with the reservoir; heating the reservoir of the sample flask in a bath. The method may also include rotating the sample flask around the axis by a first actuator during the heating, and supplying a purge gas from a purge gas source to a purge tube. The purge tube may extend within the neck of the sample flask along the axis, such that a vapor channel is defined between an inner surface of the neck and an outer surface of the purge tube. The purge tube may include a proximal end, a distal end, a wall provided at the distal end such that the distal end is closed, an inner lumen extending along the axis between the proximal end and the distal end, and an opening formed in the outer surface of the purge tube at the distal end of the purge tube and in communication with the inner lumen, and the purge gas source is in communication with the inner lumen of the purge tube. The method may also include injecting the purge gas into the sample flask via the at least one opening formed in the outer surface of the purge tube, and adjusting a position of the purge tube along the axis via a second actuator. The second actuator may be operable to translate the purge tube along the axis between a retracted position, where the at least one opening of the purge tube is situated in the neck of the sample flask, and an extended position, where the at least one opening of the purge tube is situated in the reservoir of the sample flask. The method may also include guiding vapor formed by the heating through the vapor channel into a condenser where the vapor is condensed into the solvent, and receiving the solvent in a collection flask that is in fluid communication with the condenser.

A fourteenth aspect of the present disclosure may include the thirteenth aspect, wherein the position of the purge tube is adjusted along the axis via the second actuator by adjusting a distance at which the purge tube extends into the sample flask before the solvent is evaporated by the heating.

A fifteenth aspect of the present disclosure may include the thirteenth aspect, wherein the position of the purge tube is adjusted along the axis via the second actuator by positioning the at least one opening of the purge tube within the neck of the sample flask during an initial stage of the heating, and moving the purge tube into the extended position, such that the at least one opening of the purge tube is positioned within the reservoir, at a later stage of the heating.

A sixteenth aspect of the present disclosure may include the thirteenth aspect, further comprising adjusting a flow rate of the purge gas.

A seventeenth aspect of the present disclosure may include the thirteenth aspect, further comprising adjusting a temperature of the purge gas.

A eighteenth aspect of the present disclosure may include the thirteenth aspect, further comprising adjusting a flow rate and a temperature of the purge gas.

A nineteenth aspect of the present disclosure may include the eighteenth aspect, further comprising adjusting the flow rate and the temperature of the purge gas before evaporation is caused by the heating.

A twentieth aspect of the present disclosure may include the eighteenth aspect, further comprising adjusting the flow rate and the temperature of the purge gas after evaporation is caused by the heating.

It is also noted that recitations herein of "at least one" component, element, etc., should not be used to create an inference that the alternative use of the articles "a" or "an" should be limited to a single component, element, etc. For example, the use of "at least one opening" should not be interpreted to mean that the purge tube can only include one opening.

Directional terms as used herein—for example up, down, right, left, front, back, top, bottom, upper, lower—are made only with reference to the figures as drawn and are not intended to imply absolute orientation. The terms "proximal" and "distal" are defined herein relative to a sample contained in a reservoir of a sample flask. The term "distal" refers to the position of an element that is closer to the sample in the reservoir and the term "proximal" refers to the position of an element that is further away from the sample in the reservoir.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A rotary evaporator for removing solvent from a sample, comprising:

a sample flask comprising a reservoir for receiving the sample and a neck in communication with the reservoir, wherein the neck extends along an axis;

a purge tube extending within the neck of the sample flask along the axis, such that a vapor channel is defined between an inner surface of the neck of the sample flask and an outer surface of the purge tube, wherein the purge tube comprises a proximal end, a distal end, a wall provided at the distal end such that the distal end is closed, an inner lumen extending along the axis between the proximal end and the distal end, and an opening formed in the outer surface of the purge tube at the distal end and in communication with the inner lumen;

a purge gas source in communication with the inner lumen of the purge tube for supplying a purge gas to the inner lumen of the purge tube;

a first actuator operable to rotate the sample flask about the axis;

a second actuator operable to translate the purge tube along the axis between a retracted position, where the opening of the purge tube is situated in the neck of the sample flask, and an extended position, where the at least one opening of the purge tube is situated in the reservoir of the sample flask;

a bath for receiving the reservoir of the sample flask and heating the sample when contained in the reservoir; and a collection flask in fluid communication with the vapor channel for receiving solvent evaporated from the sample.

2. The rotary evaporator of claim 1, further comprising a controller operable to control movement of the purge tube between the retracted position and the extended position.

3. The rotary evaporator of claim 1, further comprising a controller operable to control a flow rate and a temperature of the purge gas.

4. The rotary evaporator of claim 1, further comprising a flexible tube that communicatively couples the proximal end of the purge tube to the purge gas source, wherein a first end of the flexible tube is connected to the proximal end and a second end of the flexible tube is connected to the purge gas source.

5. The rotary evaporator of claim 1, wherein the opening formed in the purge tube comprises a plurality openings.

6. The rotary evaporator of claim 5, wherein the plurality of openings are evenly distributed about the outer surface of the purge tube.

7. The rotary evaporator of claim 1, further comprising a third actuator operable to move the reservoir into the bath and out of the bath, wherein the bath heats the sample contained in the reservoir when the reservoir is positioned in the bath.

8. The rotary evaporator of claim 1, wherein the second actuator comprises a drive nut and a drive screw, the drive screw being coupled to the purge tube and extending parallel to the axis, wherein the second actuator causes rotation of the drive nut, and rotation of the drive nut translates the drive screw and the purge tube in a first direction or a second direction opposite the first direction.

9. The rotary evaporator of claim 1, wherein the outer surface of the purge tube comprises a thread and the second actuator comprises a drive nut operatively arranged around the thread of the purge tube, and wherein the second actuator causes rotation of the drive nut, and rotation of the drive nut translates the purge tube in a first direction or a second direction opposite the first direction along the axis.

10. The rotary evaporator of claim 1, wherein the outer surface of the purge tube comprises a rack gear and the second actuator comprises a pinion gear engaging the rack gear of the purge tube, and wherein the second actuator causes rotation of the pinion gear, and rotation of the pinion gear translates the purge tube in a first direction or a second direction opposite the first direction along the axis.

11. The rotary evaporator of claim 1, further comprising:

a third actuator operable to move the reservoir into the bath and out of the bath, wherein the bath heats the sample contained in the reservoir when the reservoir is positioned in the bath; and a controller, wherein:

the controller is operable to control the third actuator and thereby cause movement of the sample flask into and out of the bath;

the controller is operable to control the first actuator and thereby cause rotation of the sample flask about the axis; and the controller is operable to control the second actuator and thereby cause movement of the purge tube between the retracted position and the extended position.

12. The rotary evaporator of claim 11, wherein the controller operable to control a flow rate and a temperature of the purge gas.

13. A method for evaporating a solvent from a sample, comprising:

placing the sample in a reservoir of a sample flask, wherein the sample flask comprises a neck that extends along an axis and is in communication with the reservoir;

heating the reservoir of the sample flask in a bath;

rotating the sample flask around the axis by a first actuator during the heating;

supplying a purge gas from a purge gas source to a purge tube, wherein:

the purge tube extends within the neck of the sample flask along the axis, such that a vapor channel is defined between an inner surface of the neck and an outer surface of the purge tube, the purge tube comprises a proximal end, a distal end, a wall provided at the distal end such that the distal end is closed, an inner lumen extending along the axis between the proximal end and the distal end, and an opening formed in the outer surface of the purge tube at the distal end of the purge tube and in communication with the inner lumen, and the purge gas source is in communication with the inner lumen of the purge tube;

injecting the purge gas into the sample flask via the at least one opening formed in the outer surface of the purge tube;

adjusting a position of the purge tube along the axis via a second actuator, wherein the second actuator is operable to translate the purge tube along the axis between a retracted position, where the at least one opening of the purge tube is situated in the neck of the sample flask, and an extended position, where the at least one opening of the purge tube is situated in the reservoir of the sample flask;

guiding vapor formed by the heating through the vapor channel into a condenser where the vapor is condensed into the solvent; and receiving the solvent in a collection flask that is in fluid communication with the condenser.

14. The method of claim 13, wherein the position of the purge tube is adjusted along the axis via the second actuator by adjusting a distance at which the purge tube extends into the sample flask before the solvent is evaporated by the heating.

15. The method of claim 13, wherein the position of the purge tube is adjusted along the axis via the second actuator by positioning the at least one opening of the purge tube within the neck of the sample flask during an initial stage of the heating, and moving the purge tube into the extended position, such that the at least one opening of the purge tube is positioned within the reservoir, at a later stage of the heating.

16. The method of claim 13, further comprising adjusting a flow rate of the purge gas.

17. The method of claim 13, further comprising adjusting a temperature of the purge gas.

18. The method of claim 13, further comprising adjusting a flow rate and a temperature of the purge gas.

19. The method of claim 18, further comprising adjusting the flow rate and the temperature of the purge gas before evaporation is caused by the heating.

20. The method of claim 18, further comprising adjusting the flow rate and the temperature of the purge gas after evaporation is caused by the heating.

* * * * *